UNITED STATES PATENT OFFICE.

MARTIN F. HAHN, OF HAMBURG, GERMANY.

MAKING FISH SAUSAGE.

974,660.     Specification of Letters Patent.     Patented Nov. 1, 1910.

No Drawing.     Application filed August 12, 1908. Serial No. 448,244.

*To all whom it may concern:*

Be it known that I, MARTIN F. HAHN, director, a citizen of the town of Hamburg, Germany, 10 Gröningerstrasse, have invented certain new and useful Improvements in Making Fish Sausage; and I do hereby declare the following to be a full, clear, and exact description of the invention, such as will enable others skilled in the art to which it appertains to make and use the same.

The present invention relates to the production of sausages containing fish.

It is already well known how to employ cooked fish for making sausages so as to increase the amount of nutritious matter they contain, owing to the proportion of albumin in the fish. The usual way preparing these sausages was to boil the thoroughly cleaned fish and to mix this with other meat and spicy or aromatic ingredients. Sausages produced in this manner, even when the ingredients are selected of the best quality and purity, are however very difficult to keep *i. e.* to preserve for future use, and on this account the employment of same, especially when they had to be sent to great distances, particularly in the summer, presented great difficulties. Even when the sausage together with the skin was well boiled and thoroughly smoked, no better results were attained, not taking into account that the taste of sausages produced in this manner left much to be desired and suffered moreover from the extra smoking.

The process according to the present invention is characterized by the fact that the fish which is thoroughly freed from the skin or scales, boned and most carefully washed, is subjected to a strong smoking process. It must be specially remarked here that haddocks are especially suitable for making these sausages. The smoked fish together with a portion of raw pork is finely chopped up and intimately mixed whereupon the necessary spices such as salt, pepper, paprika, and onions are added, then the mass is inserted into the skin which is to form the sausage and the latter is then boiled and again subjected to another smoking process. We thus see that smoking takes place twice, once when the haddock, as such, is thoroughly smoked by itself, whereby it is separated by no intervening medium (the skin of the sausage) from the smoke, and on the other hand the finely chopped up mass which is inserted in the skin forming the sausage is subjected to the smoking process. By intimately chopping up the smoked haddock with the raw pork, the consequent boiling of same and finally the exterior smoking of the sausage, the influences of the various ingredients on each other take place, and, in comparison with all other means of making sausages give an excellent tasting sausage of high nourishing properties and which will keep. As shown by chemical analysis, these sausages contain on an average 9 per cent. more of albumin than the ordinary kind of sausage. The amount of the fish to be used can be a proportionately high one without the savoriness suffering; for example, 70 per cent. of smoked fish and 30 per cent. of other kind of meat, for example, pork can be employed. Additions of smoked bacon add to the flavor an agreeable taste without lessening the keeping or preserving qualities and the addition of onions or vegetables akin to these, especially dried onion powder are most suitable, by reason of the water or moisture in the onion or such like vegetable being eliminated. It has also been proved advantageous to subject the skin which forms the sausage to a special treatment, which treatment consists of smearing the interior of the skin, which is to contain the mass already referred to, and form the sausage, with pork fat, before the boiling and the smoking of the sausage takes place.

When we take into consideration the enormous amount of fish especially because no purchaser can be found for same or because fresh fish will not keep to send into the interior of a country, the process which forms the subject matter of the present application represents an important advance in producing provisions and means of subsistence. It is quite easy to undertake the smoking of the fish at the place where they are taken and when they are prepared according to the process I have just described they can be sent into the interior of any country in a condition in which this article of food will keep perfectly good and fit for consumption.

Having now particularly described and ascertained the nature of my said invention and in what manner the same is to be performed I declare that what I claim is:—

1. The process of making fish sausage which comprises cleaning the fish, smoking the same after cleaning, chopping the cleaned and smoked fish and raw meat together, thereby intimately mixing them, flavoring the mixture, stuffing the flavored mixture into a skin container, boiling the container with the ingredients therein, and finally smoking the stuffed container.

2. The process of making fish sausage which comprises cleaning haddock, smoking the same after cleaning, simultaneously chopping and intimately mixing the cleaned and smoked haddock with raw pork, adding salt, pepper, paprika, onions and smoked bacon with the mixture, stuffing the seasoned mixture into a gut the interior of which has been previously smeared with pork fat, boiling the stuffed gut, and finally smoking the latter.

3. A process of making fish sausage which comprises smoking the fish meat, mixing the smoked fish meat with meat sausage material, filling the mixture into skins, boiling the sausage so made and finally smoking it.

In testimony that I claim the foregoing as my invention, I have signed my name in presence of two subscribing witnesses.

MARTIN F. HAHN.

Witnesses:
ERNEST H. L. MUMMENHOFF,
OTTO W. HELLMRICH.